(12) United States Patent
Steinberg

(10) Patent No.: US 10,656,905 B2
(45) Date of Patent: *May 19, 2020

(54) AUTOMATIC AND SELECTIVE CONTEXT-BASED GATING OF A SPEECH-OUTPUT FUNCTION OF AN ELECTRONIC DIGITAL ASSISTANT

(71) Applicant: MOTOROLA SOLUTIONS, INC, Chicago, IL (US)

(72) Inventor: Paul D. Steinberg, Wayne, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,718

(22) Filed: Feb. 6, 2019

(65) Prior Publication Data

US 2019/0179601 A1 Jun. 13, 2019

Related U.S. Application Data

(63) Continuation of application No. 15/661,209, filed on Jul. 27, 2017, now Pat. No. 10,248,379.

(51) Int. Cl.
| | |
|---|---|
| *G06F 3/16* | (2006.01) |
| *G06Q 10/10* | (2012.01) |
| *G06Q 50/30* | (2012.01) |
| *G10L 15/20* | (2006.01) |
| *G10L 21/16* | (2013.01) |

(52) U.S. Cl.
CPC .............. *G06F 3/165* (2013.01); *G06F 3/167* (2013.01); *G06Q 10/10* (2013.01); *G06Q 50/30* (2013.01); *G10L 15/20* (2013.01); *G10L 21/16* (2013.01)

(58) Field of Classification Search
CPC ......... G10L 15/20; G10L 21/16; G06F 3/165; G06F 3/167
USPC ........... 700/94; 704/232, 274, 275; 715/727, 715/728
See application file for complete search history.

(56) References Cited

U.S. PATENT DOCUMENTS

| | | | |
|---|---|---|---|
| 9,037,455 B1 | 5/2015 | Faaborg et al. | |
| 9,368,114 B2 | 6/2016 | Larson et al. | |
| 9,479,387 B2 | 10/2016 | Arabo et al. | |
| 9,928,837 B2 | 3/2018 | Choi | |
| 2002/0083025 A1 | 6/2002 | Robarts et al. | |
| 2003/0154079 A1 | 8/2003 | Ota et al. | |
| 2010/0216509 A1 | 8/2010 | Riemer et al. | |
| 2013/0218553 A1 | 8/2013 | Fujii et al. | |

(Continued)

FOREIGN PATENT DOCUMENTS

EP 3035317 A1 6/2016

*Primary Examiner* — Jesse A Elbin
(74) *Attorney, Agent, or Firm* — Daniel R. Bestor

(57) ABSTRACT

A process at an electronic computing device (device) for automatic and selective context-based gating of an electronic digital assistant speech-output function includes detecting, via a sensor communicatively coupled to the device or via a notification received at the device, an event associated with a need to reduce a cognitive load on the user. Responsively, temporarily gating a portion of an electronic digital assistant speech-output function to prevent reproduction to the user of one or more first speech-output events generated during a first period of time associated with the event. Subsequently, and after detecting that the event has ended, ending the temporary gating to allow reproduction of one or more second speech-output events generated during a second period of time after the event has ended.

15 Claims, 3 Drawing Sheets

(56) References Cited

U.S. PATENT DOCUMENTS

2015/0160019 A1    6/2015  Biswall et al.
2016/0042767 A1    2/2016  Araya et al.
2016/0101784 A1    4/2016  Olson et al.
2016/0259461 A1    9/2016  Abbate
2017/0026478 A1    1/2017  Abbate

AUTOMATIC AND SELECTIVE CONTEXT-BASED GATING OF A SPEECH-OUTPUT FUNCTION OF AN ELECTRONIC DIGITAL ASSISTANT

The present invention is a continuation application of U.S. patent application Ser. No. 15/661,209 filed in the United States Patent Office on Jul. 27, 2017, the entire contents of which is incorporated herein by reference.

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
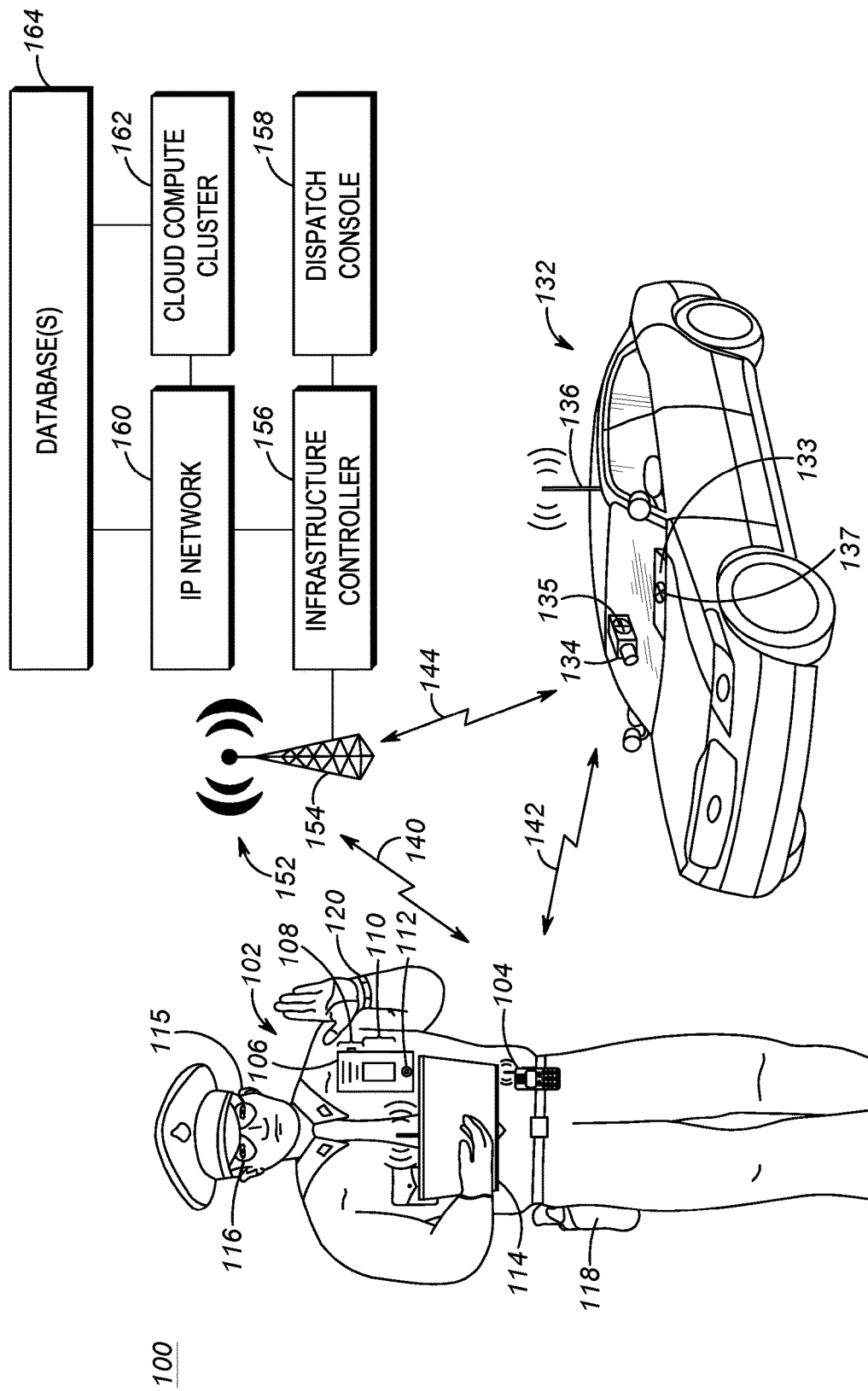
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In many cases, the electronic digital assistant may perform a task, whether in a reactive or proactive manner, that results in an auditory speech output being generated by a speech-output function and provided to and/or reproduced to a user via an output transducer of his or her communication device. However, problems exist in that (i) some environments and/or contexts in which the user may operate his or her communication device are not amenable to an electronic digital assistant provided speech-output function, (ii) the speech-output function may interfere with an operation or task the user is attempting to complete, or (iii) the user's cognitive load may already be above a threshold such that the speech-output function would not aid the user's current operation or task, among other possibilities. For example, a police officer currently operating a covert task or involved in a fire fight may not wish his or her electronic digital assistant to remind him or her about an upcoming meeting at the precinct via a speech-output function at the user's mobile or portable communications device. Additionally or alternatively, a retail employee addressing an irate customer may not wish his or her electronic digital assistant speech-output function to remind him or her to pick up returned merchandise for re-shelving while the employee is with the customer.

Thus, there exists a need for an improved technical method, device, and system for an electronic digital assistant computing device for automatic and selective context-based gating of an electronic digital assistant speech-output function.

In one embodiment a process at an electronic computing device for automatic and selective context-based gating of an electronic digital assistant speech-output function includes: detecting, by an electronic computing device associated with a user and via one or more sensors communicatively coupled to the electronic computing device or via a notification received at the electronic computing device from another computing device, an event associated with a need to reduce a cognitive load on the user; responsive to detecting the event, temporarily gating, by the electronic computing device, a portion of an electronic digital assistant speech-output function to prevent reproduction to the user of one or more first speech-output events generated during a first period of time associated with the event; and subsequently, and after detecting, by the electronic computing device associated with the user that the event has ended, ending, by the electronic computing device, the temporary gating of the portion of the electronic digital assistant speech-output function to allow reproduction of one or more second speech-output events generated during a second period of time after the event has ended.

In a further embodiment an electronic computing device associated with a user implementing an electronic digital assistant for selective context-based gating of a speech-output function includes: a memory storing non-transitory computer-readable instructions; a transceiver; and one or more processors configured to, in response to executing the non-transitory computer-readable instructions, perform a first set of functions comprising: detect, via one or more sensors communicatively coupled to the electronic computing device or via a notification received at the electronic computing device from another computing device via the transceiver, an event associated with a need to reduce a cognitive load on the user; responsive to detecting the event, temporarily gate a portion of an electronic digital assistant speech-output function to prevent reproduction to the user of one or more first speech-output events generated during a first period of time associated with the event; and subsequently, and after detecting that the event has ended, end the temporary gating of the portion of the electronic digital assistant speech-output function to allow reproduction of one or more second speech-output events generated during a second period of time after the event has ended.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices (wherein the single user 102 and the additional users may form a talkgroup of related users).

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone 135, single coupled vehicular transceiver 136, and single speaker 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoW) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (i.e., short-range in comparison to the long-range transmitter such as a LMR or broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (i.e., talkgroup members, not shown in FIG. 1) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

An in-ear or over-the ear earpiece or headphone 115 may be present for providing audio to the user in a private fashion that is not accessible to other users nearby the user 102. The earpiece or headphone 115 may be wiredly or wirelessly communicatively coupled to one or both of the RSM 106 and the portable radio 104, which may be configured to provide audio received from the RAN 152 and/or from other users to the user 102 based on a manual configuration of the RSM 106 or the portable radio 104, or based on some automatic routing mechanism at the one of the RSM 106 and the portable radio 104 that may route all audio to the earpiece or headphone 115 whenever it is detected as connected to the one of the RSM 106 and the portable radio 104, or may selectively route audio received at the one of the RSM 106 and the portable radio 104 to the earpiece or headphone 115 based on various contextual parameters, such as a content of the received audio, an identity of who sent the received audio, a covert status of the user 102, an incident status of the user 102, a determination of nearby users associated with the user 102, or some other contextual parameter.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In other embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In still other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone 135, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. The omni-directional or unidirectional microphone 135, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the single speaker 137 as being placed inside of the vehicle 132 and coupled to the vehicular computing device 133, in other embodiments, multiple speakers may be provided inside and/or outside of the vehicle 132 (all addressed simultaneously or individually addressable for outputting separate audio streams), or the single speaker 137 may be placed outside of the vehicle and function as a PA speaker, among other possibilities.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 disclosed herein and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police car or cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. In the examples of a user 102 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

b. Device Structure

Figure 2:
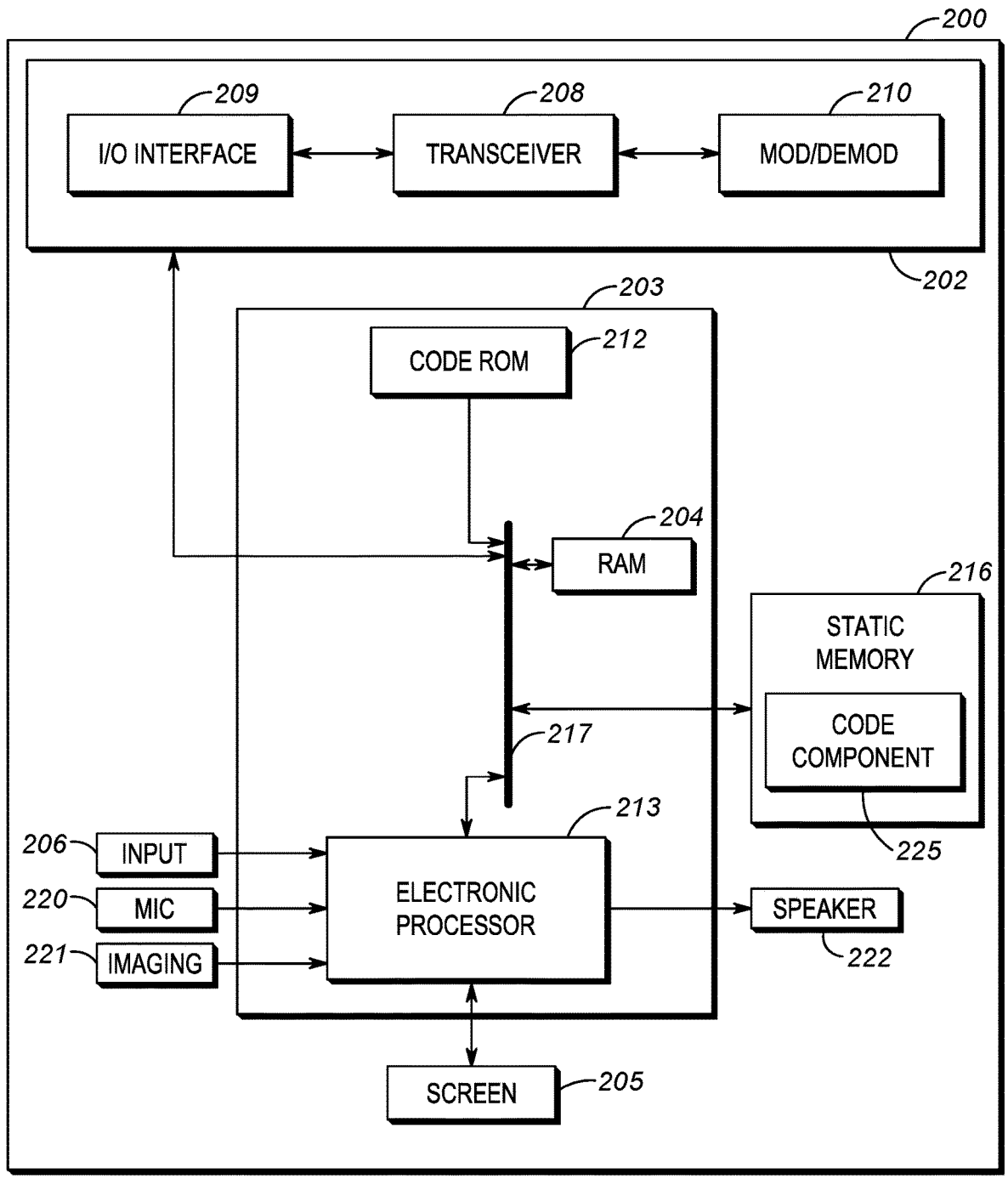
FIG. 2 is a device diagram showing a device structure of an electronic computing device for operating an electronic digital assistant, in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud compute cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the steps set forth in FIG. 3 and accompanying text.

In some embodiments, static memory 216 may also store, permanently or temporarily, a speech-output function gating mapping that maps particular sensors, particular sensor information, and/or particular notification contents to a need to reduce a cognitive load on the user, or may store, permanently or temporarily, a neural network model which may determine, based on past training, that the identity of the sensor, the sensor information, and/or particular notification contents are associated with a need to reduce a cognitive load on the user. Included in the mapping may also be a level of gating to be applied given the sensor identity, sensor information contents, and/or notification contents, ranging from a gating of subsequently generated low and/or mid-priority speech-output events generated by the electronic computing device to a complete gating of all speech-output events generated by the electronic computing device. In some embodiments, one or more intermediary mappings may also be provided, such as a first mapping that maps particular single or sets of sensor(s), particular sensor information(s), and/or particular notification content(s) to a particular context or situation, and a second mapping that maps particular contexts or situations to a need to reduce a cognitive load on the user (or may store a neural network model which may perform a same function as either first or second mappings, or both).

Alternatively, a stored inverse mapping may map the foregoing mentioned particular sensors, particular sensor information, and/or particular notification contents to a corresponding set of one or more (or all) speech-output functions to not gate during a time period associated with the event in which, by default, all speech-output functions are gated (e.g., ranging from a not gating of subsequently generated high and/or mid-priority speech-output functions to a not gating of no speech-output events). Alternatively, stored neural network model may perform a same or similar function as the inverse mapping.

The stored mapping or inverse mapping, or corresponding neural network output, may additionally or alternatively recite what to do with subsequently generated (but gated) speech-output events during the time period associated with the event (e.g., across all sensors, sensor information contents, notification contents; across all contexts or situations implicated by the sensor identity, sensor information contents, and/or notification contents; on a sensor by sensor basis, on a sensor information contents by sensor information contents basis, or on a notification contents by notification contents basis), including but not limited to discarding the generated speech-output events, translating the generated speech-output events to another communication medium (including redirecting the translated speech-output events to another device), queuing the generated speech-output events (in a time-based order or priority-based order), or some combination of two or more of the foregoing. The mapping may further additionally or alternatively recite what action to take when the event is detected to have ended (again, across all events or an a per-sensor, per-sensor information, per-notification, per-context, or per-situation basis), including but not limited to generating a notification regarding pending queued (or re-directed) speech-output events, automatically playing back queued speech-output events (in a time-generated or re-prioritized order), condensing queued speech-output events into a summarized form and playing back the summarized form of speech-output events, further delaying re-enabling the gated speech-output function for an additional period of time or until an occurrence of some other event, or some combination of two or more of the foregoing.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like.

2. Processes for Automatic and Selective Context-Based Gating of an Electronic Digital Assistant Speech-Output Function In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end cloud compute cluster 162 accessible via the IP network 160.

To use the electronic digital assistant implemented by the electronic computing device, the user 102 may, for example, provide an oral query or statement that is received by the microphone 220 of the communication device 200. The electronic computing device receives signals representative of the oral query or statement from the microphone 220 and analyzes the signals to determine the content of the oral query or statement. For example, the electronic computing device may include a natural language processing (NLP) engine configured to determine the intent and/or content of the oral query or statement. The electronic computing device may also be configured to determine a response to the oral query (for example, by retrieving stored data or by requesting data from a database such as one of the databases 164) and provide the response to an output device of the communication device 200 (for example, one or more of the speaker 222 via a generated audio response and the screen 205 via a generated text based response), and/or may be configured to determine some other action to take in light of the content of the oral query and/or statement. In other words, one or more of the communication device 200, embodied in one or more of the communication devices of FIG. 1, such as the portable radio 104, the infrastructure controller 156, and/or the cloud compute cluster 162, may include an NLP engine to analyze oral queries and/or statements received by the microphone 220 of the communication device 200 and provide responses to the oral queries and/or take other actions in response to the oral statements.

Although an oral query and/or statement is described above, in some embodiments, the electronic computing device receives and responds to other types of queries and inputs. For example, the user 102 may submit a text query to the electronic computing device by typing the text query into a hard keyboard input device 206 or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video and provide a response and/or take other actions. In still other examples, the electronic computing device may have access to other databases such as calendar or e-mail databases associated with the user 102, and may take an action as a function of some other asynchronous trigger such as receipt and processing of an upcoming calendar entry appointment associated with the user 102 or receipt of an e-mail associated with the user 102 including generating and providing an unsolicited output to an output device of the communication device 200 (for example, one or more of the speaker 222 via a generated audio response and the screen 205 via a generated text based response).

Figure 3:
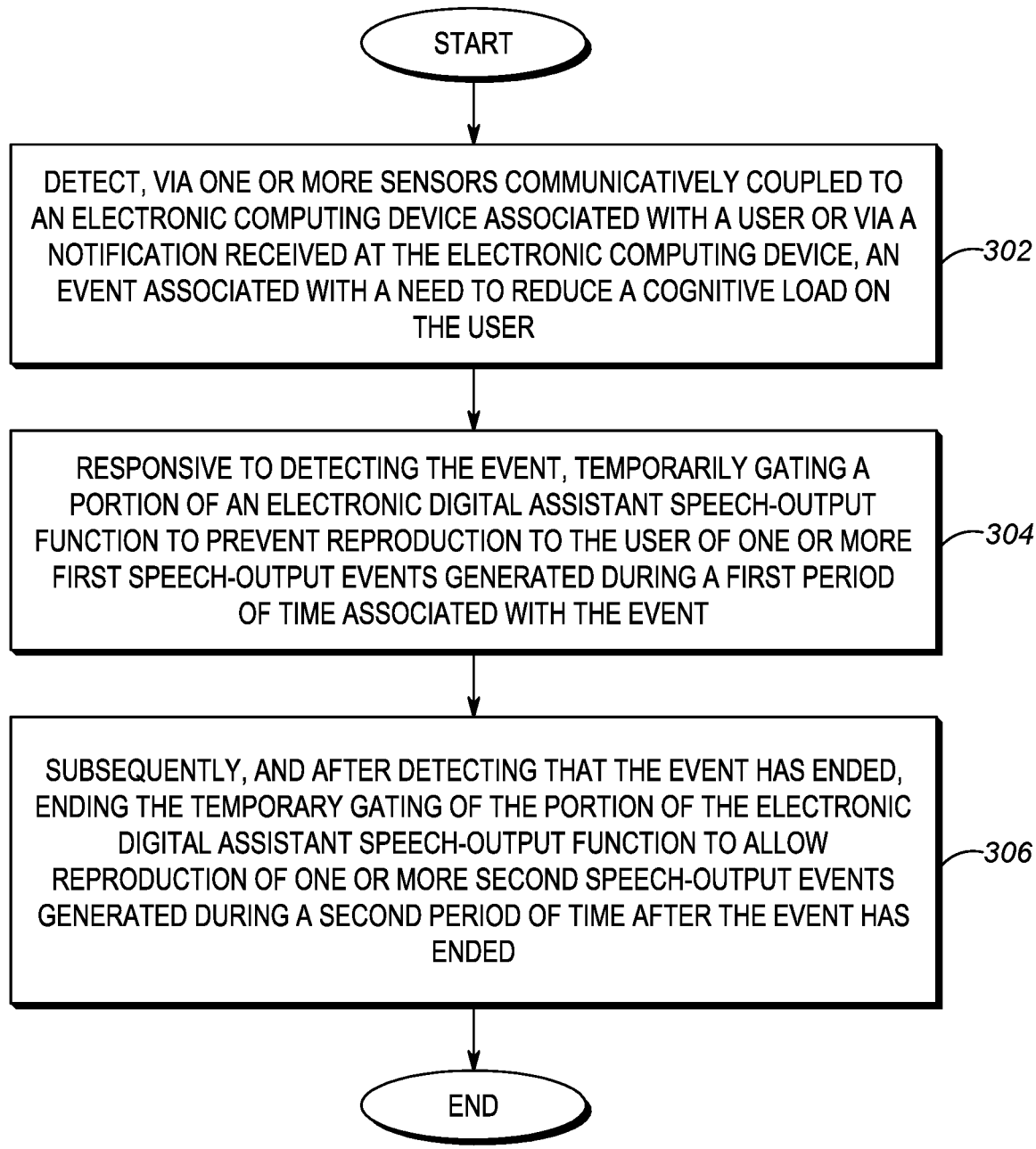
FIG. 3 illustrates a flowchart setting forth process steps for operating the electronic digital assistant of FIGS. 1 and/or 2, in accordance with some embodiments.

Turning now to FIG. 3, a flowchart diagram illustrates a process 300 at an electronic digital assistant computing device for automatic and selective context-based gating of an electronic digital assistant speech-output function. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure.

Process 300 begins at step 302 where the electronic computing device detects, via one or more sensors communicatively coupled to the electronic computing device and associated with a user, or via a notification received at the electronic computing device, an event associated with a need to reduce a cognitive load on the user, so that the user's attention may be focused on a task or event at hand and not not be interrupted or have his or her attention diverted by unnecessary or inappropriate speech-output events generated by an electronic digital assistant during a time period associated with the event.

The one or more sensors communicatively coupled to the electronic computing device may include, but is not limited to, any one or more of the sensors identified and described with respect to the user 102 and/or the vehicle 132 of FIG. 1 above and associated with the user 102. Depending on the type of sensor providing sensor information to the electronic computing device (such as a holster sensor or a biological breathing rate sensor) and a contents of the sensor information, the electronic computing device may determine that the user is or is likely experiencing an event associated with a need to reduce a cognitive load on the user. Accordingly, an event associated with a need to reduce a cognitive load on the user is any detectable (via sensors) or notifiable (via wired or wireless reception) context or situation in which the user's attention should be focused on the context or situation and not an less important speech-output events, and thus some portion of generated speech-output events should be gated (i.e., prevented from being reproduced or played back to the user) during the event. Such events may include, for example, a detected weapon-pull holster sensor trigger, a detected shot-spotter detector trigger, a detected man-down notification received from another nearby user associated with the user, a received dispatch notice from a dispatcher or commander dispatching the user to an incident or location, or assigning the user a task, a threshold detected change in acceleration of a body of the user or a vehicle associated with the user, a high-stress level detected at the user or a nearby user associated with the user, or a detected crossing or detected imminent crossing of a border into a high-risk or high-crime geofenced area (e.g., perhaps an area associated with a biological or radiological hazard), among many other possibilities.

In some embodiments, the sensor identifier and/or sensor information received at step 302 may contain discrete information such as various device states (weapon out of holster), various biological readings (breathing rates, oxygen rates, body temperature, sweat level, etc.) associated with the user, various acceleration detection parameters (e.g., from a sensor on a body of or on a vehicle associated with the user), or a particular location of the user, and it may be left to the electronic computing device to interpret the discrete information and determine that the user is or is likely (e.g., with greater than 50%, or 75%, or 90% certainty) experiencing an event associated with a need to reduce a cognitive load on the user (e.g., the user has entered a high-risk area, is experiencing an above-threshold acceleration, or the user biological readings are indicative of a high-stress level, etc.).

In other embodiments, the sensor identifier and/or sensor information received at step 302 may convey the ultimate determination, made by the sensor itself, that the user is or is likely experiencing an event associated with a need to reduce a cognitive load on the user. For example, a biological sensor tracking breathing rates and body temperature may make a determination that the stress level of the user is high and that there is a need to reduce a cognitive load on the user, and may transmit sensor information including the ultimate determination to the electronic computing device, or a location sensor may map a current location of the user to a known high-risk area, and may transmit sensor information including the ultimate determination to the electronic computing device. In still other embodiments, an acceleration sensor on a body of the user (e.g., for detecting that the user may be in a physical altercation or has fallen) or on a vehicle (e.g., for detecting acceleration indicating pursuit and/or for detecting erratic driving indicative of a user experiencing stress) associated with the user may detect an above-threshold acceleration and transmit sensor information indicating that the user is or is likely experiencing an event associated with a need to reduce a cognitive load on the user.

In some embodiments, the sensor may be the microphone of a mobile computing device such as mobile computing device 133 or a portable radio such as portable radio 104 associated with the user 102, which may detect a user's voice and apply audio analytics to captured voice audio to determine (at a processor included in the microphone or at a processor in the portable radio or mobile computing device in receipt of the voice audio), perhaps relative to some previously recorded baseline voice parameter(s), that the stress level of the user is high and that there is a need to reduce a cognitive load on the user.

As a further example, and using the embodiment of the holster sensor, if the holster sensor associated with a user detects that a weapon has been removed from the user's holster and sends sensor information to the electronic computing device one or both of identifying the sensor as a holster sensor and indicating that the holster sensor has detected a withdrawal of the user's weapon from the holster, the electronic computing device may access a mapping that maps particular sensors and/or particular sensor information to corresponding events (and their impact on a need to reduce a cognitive load on the user), or such particular sensors and/or particular sensor information may be provided to a neural network model which may determine, based on past training, that the identity of the sensor and/or the contents of the sensor information are associated with a need to reduce a cognitive load on the user. Included in the mapping may also be a level of gating to be applied given the event implicated by the sensor identity and/or sensor information contents, ranging from a gating of subsequently generated low and/or mid-priority speech-output events generated by the electronic computing device to a complete gating of all speech-output events generated by the electronic computing device.

In some embodiments, a weighting may be stored at the electronic computing device, and perhaps stored in one of the mappings set forth above, and applied to each mapping entry (such as each sensor identity and/or sensor information contents, notification contents, or context or situation), or output from a corresponding neural network, such that multiple mapping entry weightings may have their weights added together and compared to a cognitive load threshold level to determine whether an event has occurred associated with a need to reduce a cognitive load on the user. The cognitive load threshold level may be a predetermined level or levels associated with varying cognitive load levels and varying levels of gating that may be applied across all users, or may be a user-dependent level or levels that vary based on a known health history or past behavior of the user in same or similar contexts or situations. For example, each context or situation implied from the sensor identity, sensor information contents, and/or notification contents may be assigned a value between 0.1 and 1 and a threshold of 0.5-0.8 applied to all users or variable on a user by user basis.

The notification received at the electronic computing device may be a notification from some other electronic computing device associated with the same user or a different user, and may include a content similar to the sensor information (e.g., identifying some other sensor, perhaps associated with the same or the another user, and/or other sensor information generated by the other sensor, that may be associated with a need to reduce a cognitive load on the user), or may include a more specific identity of an event associated with the need to reduce a cognitive load on the user, such as a notification from dispatcher assigning the user to an incident/robbery-in-progress.

The electronic computing device may receive the notification via a local wireless network (e.g., WIFI, Bluetooth, Zigbee, etc.) and may thus determine that the sensor identity and/or information in the notification may be local and thus applicable to the user of the electronic computing device as well. Additionally or alternatively, the electronic computing device may receive the notification via an infrastructure wireless network (e.g., LMR, LTE, etc.) and may be able to determine via the contents of the notification, which may include same or similar information as set forth above and may further include a location at which sensor information or other information included in the notification was generated or an identity of a dispatcher, commander, or other user that sent the notification, and may determine from the contents of the notification that there is a need to reduce a cognitive load on the user. As just one example, another user in a vicinity (e.g., 500-1000 feet, or less than 1 mile) of the user of the electronic computing device may report a shots fired or man down situation to a dispatcher via voice, and the dispatcher may respond by sending out an all-call message notification indicating the shots fired or man down situation, and which may include a location associated with the another user, and the electronic computing device in receipt of the notification may determine, based on the user's determined proximity to the another user, that the cognitive load on the user should be reduced in order to aid the user in responding to the shots fired or man down situation. As another example, a body worn camera such as that set forth in FIG. 1 may act as a sensor and the camera itself, or the computing device that causes the camera to activate (such as the mobile computing device 133 the portable radio 104 associated with the user 102 of FIG. 1), may provide a notification (indicating that the camera has been or is activated, or indicating the ultimate determination that there is a need to reduce a cognitive load on the user) to the electronic computing device operating the electronic digital assistant, which may then be interpreted as a need to reduce a cognitive load on the user. This may also advantageously prevent low-value electronic digital assistant voice outputs from being captured on the recorded body camera video.

In a similar manner to that set forth above already with respect to sensor inputs, the electronic computing device may access a mapping that maps particular notifications to corresponding contexts or situations (and their impact on a need to reduce a cognitive load on the user), or such notifications may be provided to a neural network model which may determine, based on past training, that the notification is associated with a need to reduce a cognitive load on the user. Included in the mapping may similarly be a level of gating to be applied given the context(s) or situation(s) implicated by the notification contents, and in some embodiments, a similar weighting mechanism may be applied to each context or situation implicated by the notifications contents such that multiple notifications (and/or some combination of multiple sensors and/or multiple sensor informations) may have their assigned weights added together and compared to a cognitive load threshold level to determine an ultimate impact on a (and the rise of an 'event' associated with a) need to reduce a cognitive load on the user. In still other embodiments, the transmitter of the notification (such as the dispatcher or commander) may make the determination that the user is or is likely experiencing an event associated with a need to reduce a cognitive load on the user, and may cause a notification to be transmitted to the electronic computing device associated with the user explicitly indicating the ultimate determination without disclosing any other background event information or sensor information that caused the dispatcher or commander (or neural network model or mapping) to make such a determination. The electronic computing device may then act on the received ultimate determination of the need to reduce the cognitive load on the user in accordance with the description set forth herein.

At step 304, and responsive to detecting the event associated with the need to reduce a cognitive load on the user, temporarily gating a portion of an electronic digital assistant speech output function to prevent reproduction to the user of one or more first speech-output events generated during a first period of time associated with the event. The temporary gating is for some time period associated with the event, which may include some portion of a larger event (e.g., executing an arrest warrant at one location with respect to a city-wide initiative in which a plurality of related arrest warrants are executed), and the temporary gating may extend for some or all of a time period associated with the portion of the event, some or all of a time period associated with the larger event beyond just the event, and/or may extend for some predetermined time period after a detected end of the portion of the larger event or a detected end of the larger event, such as 1, 5, 30, or 60 minutes beyond.

The portion of the electronic digital assistant speech-output function may include anything from one single speech-output function to all speech-output functions associated with all types of speech output events. In some embodiments, certain speech-output functions may be categorized at the electronic digital assistant with a priority level, such as low-priority, default or mid-priority, and high-priority.

In the case of a police officer user associated with the electronic digital assistant, low-priority speech-output functions may be associated with non-incident related speech-output events, such as calendar notifications of work meetings (e.g., a speech-output notification of an upcoming meeting), notifications relating to patrol or jurisdiction (e.g., a speech-output notification that the police officer has left an assigned patrol route or is approaching a jurisdictional boundary such as a state line), notifications of available or pending non-current-incident-related tasks in an area adjacent the police officer or associated with the police officer (e.g., a speech-output notification of warrant checks that need to be conducted in areas nearby the current location of the police officer), receipt of e-mails, text, messages, or phone calls from unknown callers or known low-priority callers (e.g., calls from known telemarketers or personal contacts), notifications from low-priority sensors (e.g., a speech-output notification of a number of steps taken as reported by an activity tracking sensor) or other low-priority speech-output events generated at the electronic computing device. On the other hand, high-priority speech-output functions may be associated with incident related speech-output events, such as notifications of available or pending current incident-related tasks for an incident to which the police officer is assigned (e.g., a speech-output notification to secure a perimeter), receipt of e-mails, text, messages, or phone calls from known high-priority callers (e.g., calls from a commander or dispatcher associated (or not associated) with the incident the police officer is currently assigned to), notifications from high-priority sensors (e.g., a speech-output notification of a holster pull sensor or shot-spotter sensor triggered at or near the police officer), an update on a location of backup (e.g., a speech-output notification of an estimated time of arrival (ETA) or backup to the incident), notifications of approaching risks detected via video and/or audio sensors (e.g., a speech-output notification that an unidentified person has been detected approaching the police officer from a blind spot such as from behind or from a side), notifications of high-risk geographic areas (e.g., a speech-output notification that the police officer is about to or has entered a high-risk or high-crime area or a geofence associated with a hazard such as a biological or radiological hazard), notifications of high-risk structural events (e.g., a speech-output notification to evacuate a building or other structure), or other high-priority speech-output events generated at the electronic computing device. In some instances, some combination of the aforementioned low-priority or high-priority speech-output events (or other types of speech-output events) may be instead classified as a third default, or mid-level priority.

In the case of a retail worker user associated with the electronic digital assistant, low-priority speech-output functions may be associated with non-real-time-assigned task related speech-output events, such as calendar notifications of work meetings (e.g., a speech-output notification of an upcoming meeting), notifications relating to a customer visibility route for a retail department or functional area associated with the user (e.g., a speech-output notification that the retail worker has left an associated departmental area or route), notifications of available or pending non-real-time-assigned tasks in an area adjacent the retail worker or associated with another retail worker (e.g., a speech-output notification of customer visibility routes or shelf re-stocks that need to be conducted in areas nearby the current location of the retail worker but perhaps outside of his or her currently assigned department), receipt of e-mails, text, messages, or phone calls from unknown callers or known low-priority callers (e.g., calls from known telemarketers or personal contacts), notifications from low-priority sensors (e.g., a speech-output notification of a number of steps taken as reported by an activity tracking sensor) or other low-priority speech-output events generated at the electronic computing device. On the other hand, high-priority speech-output functions may be associated with real-time-assigned task incident related speech-output events, such as notifications of available or pending current real-time-assigned tasks for a retail-associated task to which the retail worker is assigned (e.g., a speech-output notification to secure a hazard marker at or near an recent liquid spill, or a speech-output notification that a customer currently needs assistance in an assigned or nearby department), receipt of e-mails, text, messages, or phone calls from known high-priority callers (e.g., calls from a shift or store manager, or pending customer service calls associated (or not associated) with the current real-time-assigned tasks the retail worker is currently assigned to), notifications from high-priority sensors (e.g., a speech-output notification of a security sensor at a display case of high-value retail store assets, or an activation of an exit-area high-value product detector for the retail establishment), an update on a location or identity of available management or store security (e.g., a speech-output notification of an identity and/or location of currently active managers and/or security personnel), notifications of approaching customers detected via video and/or audio sensors (e.g., a speech-output notification that an unidentified person, e.g., not matched to known store personnel, has been detected approaching the retail worker from a blind spot such as from behind or from a side), notifications of restricted geographic areas (e.g., a speech-output notification that the retail worker is about to or has entered a restricted area such as related to liquor sales or high-value merchandise, or related to manufacturing or other high risk areas), notifications of high-risk structural events (e.g., a speech-output notification to help customers evacuate a building or other structure due to a detected fire or other event), or other high-priority speech-output events generated at the electronic computing device. In some instances, some combination of the aforementioned low-priority or high-priority speech-output events (or other types of speech-output events) may be instead classified as a third default, or mid-level priority.

In the case of an electrical energy, petro-chemical, or mining user (worker) associated with the electronic digital assistant, low-priority speech-output functions may be associated with non-real-time-assigned task related speech-output events, such as calendar notifications of work meetings (e.g., a speech-output notification of an upcoming meeting), notifications relating to entry and/or exit of co-workers assigned to a same work-area (e.g., a speech-output notification that a particular co-worker has entered or left a particular work area, such as mine or gas-field, associated with the user), notifications of available or pending non-real-time-assigned tasks in an area adjacent the worker or associated with another worker (e.g., a speech-output notification of mining or petro-chemical related tasks in a current or nearby associated work-area, such as a current mine or gas-field within which the worker is located), receipt of e-mails, text, messages, or phone calls from unknown callers or known low-priority callers (e.g., calls from known telemarketers or personal contacts), notifications from low-priority sensors (e.g., a speech-output notification of a number of steps taken as reported by an activity tracking sensor) or other low-priority speech-output events generated at the electronic computing device. On the other hand, high-priority speech-output functions may be associated with real-time-assigned task incident related speech-output events, such as notifications of available or pending current real-time-assigned tasks for an electrical energy, petro-chemical, or mining-associated task to which the worker is assigned (e.g., a speech-output notification to secure a blast zone prior to a scheduled blast at a mine, or a speech-output notification that an electric customer in the worker's assigned area has lost power), receipt of e-mails, text, messages, or phone calls from known high-priority callers (e.g., calls from a shift or area manager, or communications associated with emergency events such as pending blasting activity), notifications from high-priority sensors (e.g., a speech-output notification of a high detected gas level or low oxygen level), an update on a location or identity of available management (e.g., a speech-output notification of an identity and/or location of currently active shift or area managers), notifications of unexpected persons in dangerous or restricted areas detected via video and/or audio sensors (e.g., a speech-output notification that an unidentified person, e.g., not matched to known personnel, has been detected in a nearby dangerous or restricted area), notifications of restricted geographic areas (e.g., a speech-output notification that the worker is about to or has entered a dangerous or restricted area such as a blasting zone or chemical leak zone), notifications of high-risk structural events (e.g., a speech-output notification to evacuate a building or other structure or area due to a detected blast, fire, biological hazard, or other event), or other high-priority speech-output events generated at the electronic computing device. In some instances, some combination of the aforementioned low-priority or high-priority speech-output events (or other types of speech-output events) may be instead classified as a third default, or mid-level priority.

Other types of speech-output events associated with other types of users may also be processed in accordance with the description herein as well.

In some embodiments, the gating of the electronic digital assistant at step 304 may, by default or by explicit configuration, only gate generated low-priority (and perhaps mid or default as well) speech-output functions of low-priority speech output events, while continuing to allow generated high-priority speech-output functions to render high-priority speech output events to the user at the electronic computing device. In still other embodiments, by default or by explicit configuration, both generated low-priority (and perhaps mid or default as well) speech-output functions (and thus events) and generated high-priority speech-output functions (and thus events) may be gated.

In still other embodiments, which priority level speech-output functions are gated may be dependent upon the identity of the sensor and the sensor information contents or the contents of the notification received at step 302. For example, in the case of a weapon-pull holster sensor trigger, all priority levels of speech-output functions may be gated. On the other hand, in the case of a biological sensor indicating the user is agitated or stressed, only low-level priority levels of speech-output functions may be gated. Other various mappings between sensors, sensor informations, notifications, and priority levels of speech-output functions to be gated are possible as well.

Once it is determined which speech-output functions at step 304 to gate, any speech-output events generated by those associated gated speech-output functions at the electronic computing device are queued, converted to a non-speech communication medium, converted and re-directed to another device, and/or discarded. More specifically, and during the first period of time, gated speech-output functions at the electronic computing device may still generate speech-output events in accordance with its configuration and received or generated triggers, but instead of the speech-output functions causing the generated speech-output events to be reproduced to the user, the generated but gated speech-output events may be added to a queue (such as a first-in, first-out (FIFO) queue maintained by the electronic computing device), may be discarded (not reproduced, not redirected, and not added to a queue), may be converted to a non-speech communication medium (e.g., such as text, instant message, e-mail) and delivered to a same communication device as the speech-output event would have been provided to (including the electronic communication device) for reproduction to the user, or converted to a non-speech communication medium and re-directed to some other communication device associated with the user different from the communication device the speech-output event would have been provided to for reproduction (e.g., a mobile computing device 133 associated with the user 102 of FIG. 1 instead of the portable radio 104). A mapping stored at the electronic computing device and/or made accessible to the electronic computing device may identify each communications device associated with the user (and the type of communication devices, such as portable radio 104, RSM 106, and/or mobile communication device 133), may identify which is a primary device or currently active device for contacting the user (e.g., such as the portable radio 104), and which secondary devices could be used for re-directing gated speech-output events (e.g., such as the mobile communication device 133). The gated speech-output event could then be converted to a non-speech communication medium by the electronic computing device and caused to be reproduced at a same device that the gated speech-output event would have been reproduced by (e.g., the portable radio 104), or reproduced at a different device (e.g., the mobile communication device 133).

At step 306, and after detecting, by the electronic computing device, that the event associated with the need to reduce the cognitive load on the user has ended, the electronic computing device ends the temporary gating of the portion of the electronic digital assistant speech-output function to allow reproduction of one or more second speech-output events generated during a second period of time after the event has ended.

The electronic computing device may detect that the event associated with the need to reduce the cognitive load on the user has ended in a same or similar way to how it detected that the event began at step 302, i.e., by detecting, via the one or more sensors communicatively coupled to the electronic computing device or via a second notification received at the electronic computing device from another computing device, that the event has ended.

Second sensor identifier and/or sensor information received at the electronic computing device may indicate an end to the event detected at step 302 (whether sensor or notification based itself) and a need to reduce the cognitive load on the user. For example, if the event detected at step 302 was a weapon-pull holster sensor trigger detected via a signal transmitted by a weapon holster sensor, detecting at step 306 that the event has ended may include detecting, via the same weapon holster sensor (or some other sensor information such as a video sensor operating video analytics), that the weapon has been returned to the weapon-holster. Additionally or alternatively, if the event detected at step 302 was a high-stress level detected via a biological sensor device at the user, detecting at step 306 that the event has ended may include detecting, via the same biological sensor device that the user's stress level has returned to a normalized range. As another still further example, if the event detected at step 302 was an entrance to a high-risk or high-crime geofenced area, detecting at step 306 that the event has ended may include detecting, via the same location sensor that detected the user's entrance into the geofenced area, the user's exit from the same high-risk or high-crime geofenced area. In other embodiments, the sensor identifier and/or sensor information received at step 306 may convey the ultimate determination, made by the sensor itself, that the user is or is likely no longer experiencing an event associated with a need to reduce a cognitive load on the user.

In some embodiments, an additional hysteresis time period may be added to a sensor-detected end of the event in order to allow the user some time to return his or her cognitive load to a reasonable level (e.g., from 1-30 minutes, 1-10 minutes, or 1-5 minutes).

Additionally or alternatively, a second notification received at step 306 may indicate an end to the event detected at step 302 (whether sensor or notification based itself), in a same or similar manner to that already set forth above with respect to step 302, but instead explicitly indicating an end to the event (or implicitly indicating an end to the event by being mapped at the electronic computing device to an end to a corresponding event via an explicit mapping or neural network model) instead of a start to the event.

In still other examples, the electronic computing device may apply some form of timer function or end-time comparison function relative to a time parameter associated with the event such that every event detected at step 302 has a corresponding end-time after which the event associated with the need to reduce the cognitive load on the user would be considered ended. A same time parameter may be used for every type of event detected at step 302 (perhaps based on the underlying context or situation, or particular sensor (s), particular sensor information(s), and/or particular notification(s) contents), or different time parameters may be applied for different types of events. For example, a weapon-pull holster sensor trigger detected at step 302 may be mapped to or associated with a need to reduce a cognitive load on the user for a relatively longer time period of 30 minutes (e.g., such that the event is considered to be ended after a time period of 30 minutes passes after the event, in this case the weapon-pull holster sensor trigger, is detected at step 302), while a traffic-stop context or situation detected at step 302 may be mapped to or associated with a need to reduce a cognitive load on the user for a relatively shorter time period of 5, 10, or 15 minutes. Other examples are possible, and other time parameters could be applied.

The ending of the gating of the portion of the electronic digital assistant speech-output function means that subsequent speech-output events generated during a second period of time after the first period of time and associated with the same speech-output function gated at step 304 are instead immediately reproduced (e.g., played back via a speaker to the user instead of being queued, converted to a non-speech communication medium, converted and re-directed, and/or discarded). For example, if only low-priority speech-output functions were gated during step 304, at and after step 306, any subsequently generated low-priority speech-output events generated by the low-priority speech-output functions would be immediately reproduced instead of being queued, converted to a non-speech communication medium, converted and re-directed, and/or discarded as during the first time period. On the other hand, if all speech-output functions were gated during step 304, at and after step 306, all subsequently generated speech-output events generated by the speech-output functions may be immediately reproduced instead of being queued, converted to a non-speech communication medium, converted and re-directed, and/or discarded. In some embodiments, even if all speech-output events were gated at step 304, at and after step 306, only some portion of all of the speech-output functions previously gated at step 304 may be ended and allowed to immediately reproduce generated speech-output events, such as only mid and/or high priority speech output events generated by mid and/or high priority speech output functions. The continued gating of low and/or mid-priority speech-output functions may then continue for some additional time period beyond the high priority speech output functions (such as single, double, or triple the time hysteresis and/or time parameter periods set forth above).

Furthermore, and after the gating has ended for subsequently generated speech-output events by corresponding speech-output functions, the electronic computing device may take further actions on any speech-output events generated during the first time period but not reproduced due to the gating. In the event that the electronic computing device was configured to discard the speech-output events generated during the first time period, of course no further action would be required at or after step 306 relative to those speech-output events generated during the first time period.

On the other hand, to the extent that the speech-output events generated during the first time period were queued, the electronic computing device may cause the queued speech-output events to be reproduced (by the corresponding, now no longer gated, speech-output functions) during the second time period. The queued speech-output events may be reproduced to the user by the electronic computing device in a same order in which they were generated, or may be re-ordered into a different order than that which they were generated and reproduced in that different order. For example, and to the extent that the generated speech-output events queued during the first time period are associated with low, mid, and high priority speech-output events, the generated speech-output events may be re-ordered to reproduce the high priority speech-output events (if any) prior to the mid-priority speech output events (if any) and still prior to the low-priority speech output events (if any). Still further, the generated speech-output events may be reproduced in some other order, such as a contextual order such that generated speech-output events determined to be associated with the event associated with the need to reduce the cognitive load on the user detected at step 302 are reproduced prior to generated speech-output events not determined to be associated with the event associated with the need to reduce the cognitive load on the user detected at step 302. Other contextual parameters may be used as well, or instead, to re-order the queued speech-output events.

In some embodiments, a prompt may be displayed at a display element or via a speaker-output element of the electronic computing device notifying the user that generated speech-output events from the first time period are queued and awaiting reproduction, and the electronic computing device may wait to reproduce the queued speech-output events in any manner already noted above until a user input gesture or action is detected (e.g., a user manipulation of a touch-screen interface or a user voice command) associated with a user request to begin reproducing the queued speech-output events.

In other embodiments, and where a plurality of speech-output events are generated during the first time period, the electronic computing device at step 306 may determine whether any of the queued speech-output events are no longer relevant and may discard some or all of them prior to reproducing them. For example, a speech-output event associated with a notification regarding a nearby incident that has since been resolved (and indicated via messaging to the electronic computing device that it has been resolved) may be removed from the queue prior to being reproduced. As another example, multiple related queued speech-output notifications may be combined (e.g., condensed) into a shorter summary description of the multiple related queued speech-output notifications and the summary description reproduced to the user in place of the multiple related queued speech-output notification. For example, multiple separate speech-output notifications associated with occurrences during a same nearby incident may be condensed into a single shorter summary description of what occurred during the nearby incident and reproduced to the user in the summary form.

While the above description focused on individual speech-output events, in some embodiments, same or similar speech-output functions as set forth above could be applied to reproduce group-based speech-output events and which may be gated in a same or similar fashion to that set forth above. For example, where an event associated with a need to reduce a cognitive load on a talkgroup of a plurality of users originates at any one of the electronic computing devices that are a member of the talkgroup, or originates at some other communications device such as dispatch console 158 of FIG. 1, and a notification is sent indirectly to all of the talkgroup members via an infrastructure RAN such as the infrastructure RAN 152, or sent directly to all of the talkgroup members via a direct-mode communications session, a same or similar speech-output gating function may be applied as set forth above at step 304 (e.g., at the infrastructure controller 156 or at the cloud compute cluster 162 via an assigned group voice channel, or at individual member electronic computing devices in the group notified of the group-based speech-output event by the infrastructure controller 156 or the cloud computer cluster 162 or other member of the talkgroup), and similar end-of-gating and speech-output reproduction functions applied to the group at step 306 (e.g., at the infrastructure controller 156 or at the cloud compute cluster 162 via an assigned group voice channel, or at individual member electronic computing devices in the group notified of the end of the group-based speech-output event by the infrastructure controller 156 or the cloud computer cluster 162 or other member of the talkgroup). Gating the group-based speech-output event at the infrastructure controller 156 or at the cloud compute cluster 162 via an assigned group voice channel may include a group-based speech-output function at the infrastructure controller 156 or at the cloud compute cluster 162 not requesting an assigned group voice channel to playback the group-based speech output event to the group of member devices in accordance with the foregoing description, or may include a group-based speech-output function at the infrastructure controller 156 or at the cloud compute cluster 162 not playing back the group-based speech output event to the group over an already-established group voice channel for the group of member devices in accordance with the foregoing description.

Ending the gating of the group-based speech-output event at the infrastructure controller 156 or at the cloud compute cluster 162 via the assigned group voice channel may include the group-based speech-output function at the infrastructure controller 156 or at the cloud compute cluster 162 substantially immediately requesting an assigned group voice channel to playback the group-based speech output event to the group of member devices in accordance with the foregoing description, or may include the group-based speech-output function at the infrastructure controller 156 or at the cloud compute cluster 162 substantially immediately playing back the group-based speech output event to the group over the already-established group voice channel for the group of member devices in accordance with the foregoing description.

Gating the group-based speech-output event at the end-user electronic computing devices/members of the talkgroup may include receiving particular sensors, particular sensor information, and/or particular notification contents from the source device (whether that is, for example, an infrastructure controller such as infrastructure controller 156 of FIG. 1, a cloud compute cluster such as cloud computer cluster 162 of FIG. 1, or another talkgroup member electronic computing device such as mobile communication device 133 transmitting a notification to talkgroup member portable radio 104) addressed to the talkgroup and subsequently locally gating a speech-output function in accordance with the foregoing description. Ending the gating of the group-based speech-output event at the end-user electronic computing devices/members of the talkgroup may then include receiving other particular sensors, particular sensor information, and/or particular notification contents from the source device (again, whether that is, for example, an infrastructure controller such as infrastructure controller 156 of FIG. 1, a cloud compute cluster such as cloud computer cluster 162 of FIG. 1, or another talkgroup member electronic computing device such as mobile communication device 133 transmitting a notification to talkgroup member portable radio 104) addressed to the talkgroup and subsequently locally ending the gating of the speech-output function in accordance with the foregoing description.

3. Conclusion

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method at an electronic computing device for automatic and selective context-based gating of an electronic digital assistant speech-output function to reduce a cognitive load on a user, the method comprising:

detecting, by an electronic computing device associated with a user and via sensor content information from one or more sensors communicatively coupled to the electronic computing device or via notification dispatch content information in a dispatch notification received at the electronic computing device from another computing device or via a body worn camera activation notification received at the electronic computing device from the body worn camera, that the user is or is likely currently experiencing an event associated with a need to reduce a cognitive load on the user;

responsive to detecting the event, temporarily gating, by the electronic computing device, a portion of an electronic digital assistant speech-output function to prevent reproduction to the user of one or more non-incident-related speech-output events generated during a first period of time associated with the event while allowing reproduction to the user of one or more incident-related speech-output events generated during the first period of time associated with the event; and subsequently, and after detecting, by the electronic computing device associated with the user that the event has ended, ending, by the electronic computing device, the temporary gating of the portion of the electronic digital assistant speech-output function to allow reproduction of one or more non-incident-related speech-output events generated during a second period of time after the event has ended;

wherein the incident-related speech-output events include one or more selected from an e-mail reception speech-output event for a received e-mail from a source associated with the event, a text message reception speech-output event for a received text message from a source associated with the event, a phone call reception speech-output event for a received phone call from a source associated with the event, a detected shots fired speech-output event, a detected available related task speech-output event for a detected task related to the event, a detected officer down speech-output event, a detected person approaching the user from one or more visual blind spots associated with the user speech-output event, a detected evacuate structure speech-output event, a detected holster pull-sensor speech-output event, a detected geofence crossing speech-output event associated with a detection of the user crossing into a crime-related geofenced area or a biological hazard geofenced area or a radiological area geofenced area or a restricted entry geofenced area, and a detected backup arrived on scene speech-output event; and wherein the non-incident-related speech-output events include one or more selected from a calendar notification speech-output event, a patrol route or jurisdictional boundary speech-output event, a detected available unrelated task speech-output event for a task unrelated to the event, an e-mail reception speech-output event for a received e-mail from an unknown source or source not associated with the event, a text message reception speech-output event for a received text message from an unknown source or source not associated with the event, and a phone call reception speech-output event for a received phone call from an unknown source or source not associated with the event.

2. The method of claim 1, further comprising:

during the first period of time, queuing the one or more generated non-incident-related speech-output events and, after detecting that the event has ended, playing back, by the electronic computing device, at least one of the queued one or more generated non-incident-related speech-output events.

3. The method of claim 2, wherein a prompt is displayed at a display element of one of a mobile and a portable computing device associated with the user indicating that the queued one or more generated non-incident-related speech-output events are now available for reproduction, and responsive to detecting a user input operation associated with playing back the queued one or more generated non-incident-related speech-output events, playing back the queued one or more generated non-incident-related speech-output events at the one of the mobile and portable computing device.

4. The method of claim 2, wherein a plurality of generated non-incident-related speech-output events are generated and queued during the first period of time, the method further comprising, after detecting that the event has ended, playing back, by the electronic computing device, the queued plurality of generated non-incident-related speech-output events in a priority order that is different from an order in which they were generated.

5. The method of claim 2, wherein a plurality of generated non-incident-related speech-output events are at least initially queued and not reproduced during the first period, and the method further comprising, after detecting that the event has ended, removing from the queue or refraining from playing back, at least one of the plurality of generated non-incident-related speech-output events determined to be duplicative or no longer relevant.

6. The method of claim 2, wherein a plurality of generated non-incident-related speech-output events are at least initially queued and not reproduced during the first period, and the method further comprising, after detecting that the event has ended, condensing the plurality of generated non-incident-related speech-output events into a summary description of the plurality of generated non-incident-related speech-output events and playing back, by the electronic computing device, the summary description of the plurality of generated non-incident-related speech-output events.

7. The method of claim 1, wherein detecting the event associated with the need to reduce the cognitive load on the user comprises detecting, via the sensor content information from the one or more sensors communicatively coupled to the electronic computing device, location information indicating that the user has entered a geographic area associated with a need to reduce a cognitive load on the user.

8. The method of claim 1, wherein detecting the event associated with the need to reduce the cognitive load on the user comprises detecting, via the sensor content information from the one or more sensors communicatively coupled to the electronic computing device, acceleration information indicating an acceleration of one of the user and a vehicle associated with the user beyond a threshold minimum level.

9. The method of claim 1, wherein the detecting that the user is or is likely currently experiencing an event associated with the need to reduce the cognitive load on the user comprises detecting, by the electronic computing device associated with the user and via notification dispatch content information in the dispatch notification received at the electronic computing device from another computing device, that the user has been dispatched by a dispatcher to respond to the event.

10. The method of claim 1, wherein the detecting that the user is or is likely currently experiencing an event associated with the need to reduce the cognitive load on the user comprises detecting, by the electronic computing device associated with the user and via the body worn camera activation notification received at the electronic computing device from the body worn camera, that the body warn camera has been activated.

11. The method of claim 1, wherein:
the incident-related speech-output events include the e-mail reception speech-output event for the received e-mail from the source associated with the event, the text message reception speech-output event for the received text message from the source associated with the event, and the phone call reception speech-output event for the received phone call from the source associated with the event; and
the non-incident-related speech-output events include the e-mail reception speech-output event for the received e-mail from the unknown source or source not associated with the event, the text message reception speech-output event for the received text message from the unknown source or source not associated with the event, and the phone call reception speech-output event for the received phone call from the unknown source or source not associated with the event.

12. The method of claim 1, further comprising sending, by the electronic computing device, a notification to other electronic devices that are a member of a same talkgroup as the electronic computing device to apply a same temporary gating of the portion of the speech-output function.

13. The method of claim 1, wherein:
the incident-related speech-output events include one or more selected from a detected shots fired speech-output event, a detected available related task speech-output event for a detected task related to the event, a detected officer down speech-output event, a detected person approaching the user from one or more visual blind spots associated with the user speech-output event, a detected evacuate structure speech-output event, a detected holster pull-sensor speech-output event, a detected geofence crossing speech-output event associated with a detection of the user crossing into a crime-related geofenced area, and a detected backup arrived on scene speech-output event; and
the non-incident-related speech-output events include one or more selected from a calendar notification speech-output event, a patrol route or jurisdictional boundary speech-output event, and a detected available unrelated task speech-output event for a task unrelated to the event.

14. The method of claim 1, further comprising:
detecting a plurality of (i) one or more sensor content information from the one or more sensors communicatively coupled to the electronic computing device or (ii) one or more dispatch or body warn camera activation notifications received at the electronic computing device from another computing device;
for each sensor content information and for each dispatch or body warn camera activation notification, accessing, by the electronic computing device, a mapping or neural network associating each respective sensor content information or dispatch or body warn camera activation notification with a cognitive load impact weighing;
adding together each cognitive load impact weighting from the mapping for each sensor content information and for each dispatch or body warn camera activation notification content information to identify a total cognitive load impact;
comparing the total cognitive load impact to a stored cognitive load threshold level; and
only when the total cognitive load impact exceeds the stored cognitive load threshold level, temporarily gating, by the electronic computing device, the portion of the electronic digital assistant speech-output function to prevent reproduction to the user of one or more non-incident-related speech-output events generated during the first period of time associated with the event.

15. An electronic computing device associated with a user implementing an electronic digital assistant for selective context-based gating of a speech-output function during detected high cognitive load events, the electronic computing device comprising:
a memory storing non-transitory computer-readable instructions;
a transceiver; and
one or more processors configured to, in response to executing the non-transitory computer-readable instructions, perform a first set of functions comprising:
detect, via sensor content information from one or more sensors communicatively coupled to the electronic computing device or via notification dispatch content information in a dispatch notification received at the electronic computing device from another computing device via the transceiver or via a body worn camera activation notification received at the electronic computing device from the body worn camera via the transceiver, that the user is or is likely currently experiencing an event associated with a need to reduce a cognitive load on the user;
responsive to detecting the event, temporarily gate a portion of an electronic digital assistant speech-output function to prevent reproduction to the user of one or more non-incident-related speech-output events generated during a first period of time associated with the event while allowing reproduction to the user of one or more incident-related speech-output events generated during the first period of time associated with the event; and
subsequently, and after detecting that the event has ended, end the temporary gating of the portion of the electronic digital assistant speech-output function to allow reproduction of one or more non-incidentrelated speech-output events generated during a second period of time after the event has ended;
wherein the incident-related speech-output events include one or more selected from an e-mail reception speech-output event for a received e-mail from a source associated with the event, a text message reception speech-output event for a received text message from a source associated with the event, a phone call reception speech-output event for a received phone call from a source associated with the event, a detected shots fired speech-output event, a detected available related task speech-output event for a detected task related to the event, a detected officer down speech-output event, a detected person approaching the user from one or more visual blind spots associated with the user speech-output event, a detected evacuate structure speech-output event, a detected holster pull-sensor speech-output event, a detected geofence crossing speech-output event associated with a detection of the user crossing into a crime-related geofenced area or a biological hazard geofenced area or a radiological area geofenced area or a restricted entry geofenced area, and a detected backup arrived on scene speech-output event; and
wherein the non-incident-related speech-output events include one or more selected from a calendar notification speech-output event, a patrol route or jurisdictional boundary speech-output event, a detected available unrelated task speech-output event for a task unrelated to the event, an e-mail reception speech-output event for a received e-mail from an unknown source or source not associated with the event, a text message reception speech-output event for a received text message from an unknown source or source not associated with the event, and a phone call reception speech-output event for a received phone call from an unknown source or source not associated with the event.

* * * * *